H. BECKNER & R. M. GERBER.
COMPOUNDING DEVICE.
APPLICATION FILED OCT. 26, 1914.
1,177,295.
Patented Mar. 28, 1916.
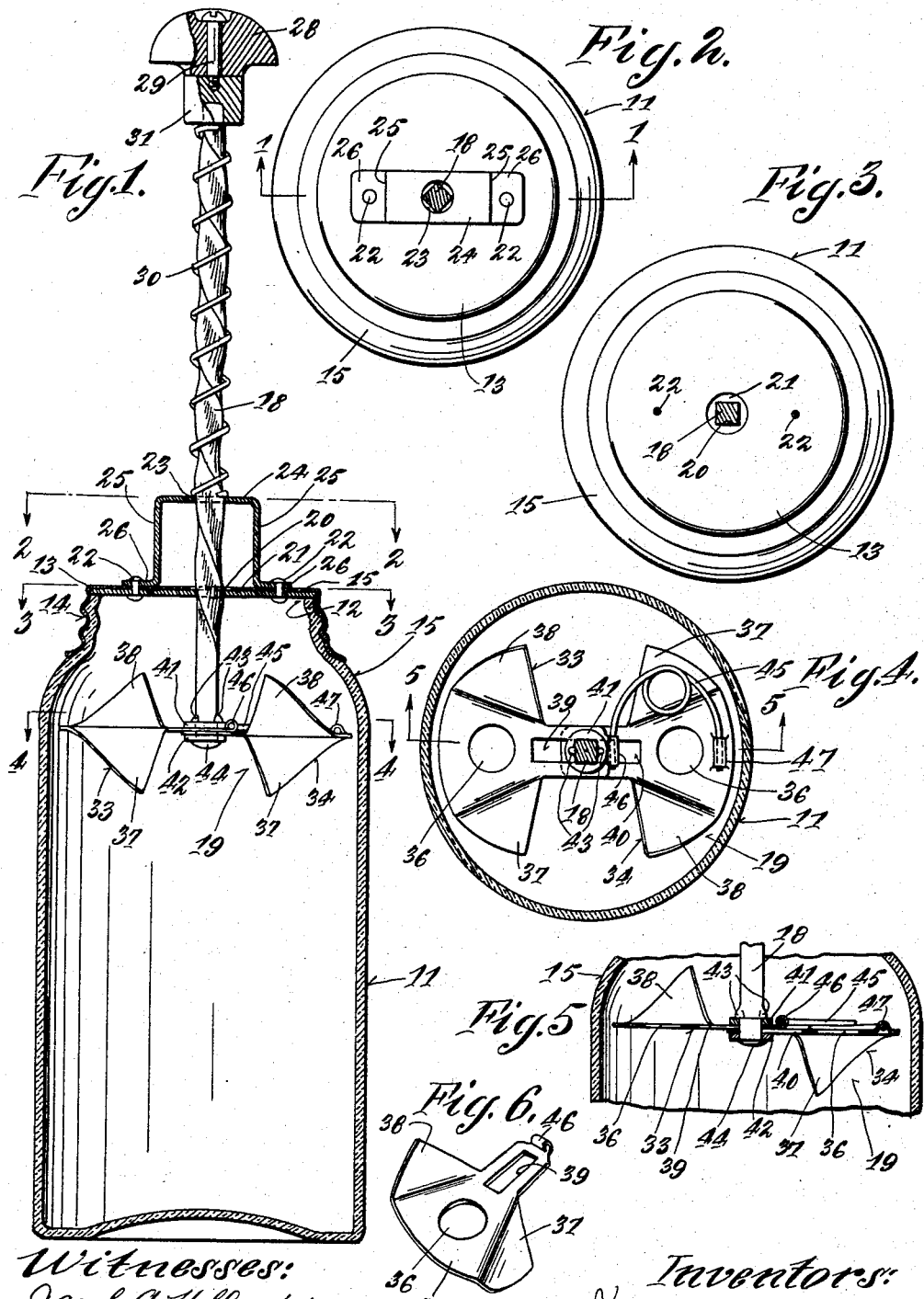

UNITED STATES PATENT OFFICE.

HENRY BECKNER AND RALPH M. GERBER, OF CINCINNATI, OHIO.

COMPOUNDING DEVICE.

1,177,295.  Specification of Letters Patent.  Patented Mar. 28, 1916.

Application filed October 26, 1914. Serial No. 868,644.

*To all whom it may concern:*

Be it known that we, HENRY BECKNER and RALPH M. GERBER, citizens of the United States, residing at Cincinnati, in the county of Hamilton and State of Ohio, have jointly invented certain new and useful Improvements in Compounding Devices, of which the following is a specification.

Our invention relates to a compounding device, having the purpose, for instance, of compounding butter and milk, that is to say, mixing the butter with milk for forming a homogeneous fatty mass of a bulk embodying both the butter and the milk and serving the purposes of the butter. The device is intended primarily for home use for reducing the high cost of living. The device may be used for analogous or other purposes for which it is adapted.

It is the object of our invention to provide a device of the character stated having novel parts and arrangements of parts for insuring easy operation and quick accomplishment of its purposes.

The invention will be further readily understood from the following description and claims, and from the drawings, in which latter:

Figure 1 is a side elevation of our improved device, showing the container and the closure thereof in central vertical section on the line 1—1 of Fig. 2. Fig. 2 is a horizontal section of our improved device, taken on the line 2—2 of Fig. 1. Fig. 3 is a horizontal section of the same, taken on the line 3—3 of Fig. 1. Fig. 4 is a horizontal section of the same, taken on a line corresponding to the line 4—4 of Fig. 1. Fig. 5 is a vertical section of the beater parts taken on the line 5—5 of Fig. 4; and, Fig. 6 is a perspective view of one of the beater-blades.

11 represents the container, shown as a glass jar, having an opening 12 and a cover 13, the cover being secured to the container by means of a screw connection 14. The container is preferably provided below its mouth or opening with a neck 15 having an inner tapering face. A rod 18 is arranged to have up and down movement in the cover and is provided at its lower end with a beater 19 arranged to beat the material to be acted on located in the container, which material may be a mixture of butter and milk for compounding the same. The rod is shown as a twisted rod. It is arranged to pass through a bearing 20 in a bearing plate 21 rigidly secured to the cover, as by rivets 22, and through a bearing 23 in an upwardly bowed cross-strap 24, the sides 25 whereof have feet 26 securely attached to the cover, as by means of the rivets 22.

The bearing 23 is spaced from the cover and is preferably a round bearing, in which the twisted rod 18 turns. The rod 18 is shown as square in cross-section. The walls of the bearing 20 are correspondingly formed, namely square, so that when the rod passes through this bearing lengthwise it is caused to rotate for rotating the beater 19.

The upper end of the rod is provided with a handle 28 having journal-connection 29 therewith. A helical spring 30 surrounds the rod and extends lengthwise thereof and is located between the cross-strap 24 and a collar 31 rigid with the upper end of the rod, upon which the handle 28 turns. The handle 28 is shown as a pusher-knob for conveniently operating the beater, which is accomplished by pushing upon the handle with the hand, the spring retracting the rod lengthwise to normal position for locating the beater in the upper end of the container.

The beater is shown as comprising a plurality of blades 33, 34, having relative movement between them for increasing or decreasing the extent to which they spread for being readily received through the opening 12 and arranged to spread in the container for forming said beater of greater width than the width of said opening.

The blades are provided with openings 36 and with downwardly extending wings 37 and with upwardly extending wings 38, these wings preferably slanting outwardly in their upward and outward directions, for forming propeller-like wings for readily agitating and swirling the contents of the container, these contents being also permitted to pass through the openings for aiding in the beating of the same.

The blades are provided respectively with slots 39, 40, through which the rod is received, the side walls of the slots impinging the sides of the rod for preventing turning of the blades upon the rod. The blades are located between washers 41, 42, held in place at the lower end of the rod, as by providing said rod adjacent to its lower end with outwardly extending prongs 43 and upsetting the lower end of said rod, as shown at 44. The washers form guiding means for the blades for permitting said blades to move in their planes inwardly and outwardly for increasing or decreasing the distances between their outer ends. A spring 45 is secured to the respective blades, as by being received under struck up lugs 46, 47, struck up from said blades for locating said spring.

If it is desired to insert the beater into the container, the blades are pushed inwardly, so that their outer edges are sufficiently close together to pass through the opening 12. When they have passed through this opening, the blades will spread by reason of the action of the spring 45, so that the beater will have a diameter greater than the opening 12 and be approximately of the diameter of the body of the container. After the mixture has been compounded, which in the case of equal parts of butter and milk is accomplished in a few minutes, the beater is withdrawn after unfastening of the cover, the outer edges of the beater blades contacting the sloping wall of the neck 15 for causing approach between the outer edges of said blades for permitting the same to pass through the container mouth.

The bearing-plate 21 is preferably sufficiently large so that its peripheral edge is received between the upper edge of the mouth of the container and the top of the cover for clamping the plate between the container and cover for aiding in rigidity of the parts.

Our improved device forms a simple and effective device of few parts substantially constructed and economically produced.

Having thus fully described our invention, what we claim as new and desire to secure by Letters Patent, is:

1. In a device of the character described, the combination of a container having an opening, a cover for said opening, a twisted rod, a bearing therefor on said cover, and a beater at the lower end of said rod comprising a plurality of blades having relative movement for causing their outer edges to approach each other for being received through said opening of said container, and a spring for automatically relatively spreading said blades in said container.

2. In a device of the character described, the combination of a container having an opening, a cover for said opening, means for securing said cover to said container, a rod, said rod and cover having connections for turning said rod upon longitudinal movement thereof, and a beater, said beater comprising a plurality of blades having openings and upwardly and downwardly extending edges forming wings, said blades having slide-connection with the lower end of said rod and with each other for relative movement of said blades in parallel planes, and a spring normally causing outward movement of said blades.

In testimony whereof, we have hereunto signed our names in the presence of two subscribing witnesses:

HENRY BECKNER.
RALPH M. GERBER.

Witnesses:
 CHARLES E. WEBER.
 THERESA M. SILBER.

Copies of this patent may be obtained for five cents each, by addressing the "Commissioner of Patents, Washington, D. C."